United States Patent [19]
Ivie et al.

[11] Patent Number: 5,815,086
[45] Date of Patent: Sep. 29, 1998

[54] AUTOMATED APPLIANCE CONTROL SYSTEM

[75] Inventors: Lovell Brent Ivie, Sandy; Daniel Gilstrap, Salt Lake City, both of Utah

[73] Assignee: IES Technologies, Inc., Sandy, Utah

[21] Appl. No.: 623,668

[22] Filed: Mar. 28, 1996

Related U.S. Application Data

[63] Continuation of Ser. No. 326,684, Oct. 20, 1994, abandoned.

[51] Int. Cl.⁶ ............................................... H04B 1/00
[52] U.S. Cl. ..................... 340/825.52; 307/28; 307/40; 340/825.72; 340/310.01
[58] Field of Search ................. 307/11, 38, 40, 307/42; 340/825.52, 825.56, 825.72, 310.01, 310.02

[56] References Cited

U.S. PATENT DOCUMENTS

| | | | |
|---|---|---|---|
| 4,418,333 | 11/1983 | Schwarzbach et al. | 340/825.07 |
| 4,422,180 | 12/1983 | Wendt | 455/603 |
| 4,509,211 | 4/1985 | Robbins | 455/603 |
| 4,746,919 | 5/1988 | Reitmeier | 340/825.56 |
| 4,763,104 | 8/1988 | Inoue et al. | 340/827 |
| 5,051,720 | 9/1991 | Kittirutsunetorn | 340/310.02 |
| 5,086,298 | 2/1992 | Katsu et al. | 340/825.69 |
| 5,086,385 | 2/1992 | Launey et al. | 364/188 |
| 5,090,024 | 2/1992 | Vander Mey et al. | 375/1 |
| 5,109,222 | 4/1992 | Welty | 340/825.72 |
| 5,114,365 | 5/1992 | Thompson et al. | 439/540 |
| 5,187,655 | 2/1993 | Post et al. | 364/146 |
| 5,252,967 | 10/1993 | Brennan et al. | 340/870.02 |
| 5,268,666 | 12/1993 | Michel et al. | 340/310 R |
| 5,289,365 | 2/1994 | Caldwell et al. | 364/138 |
| 5,352,957 | 10/1994 | Werner | 340/310.06 |

FOREIGN PATENT DOCUMENTS

| | | | |
|---|---|---|---|
| 4123206 | 1/1993 | Germany | 340/825.72 |

OTHER PUBLICATIONS

"Control Networks For The Home," Machine Design, vol. 55, No. 24, (Oct. 1983), pp. 109–112.

"Networking the Intelligent Home," IEEE Spectrum, (Oct. 1989), pp. 48–49.

Article "The Medium Carries the Message" by Scott Wilkinson, Audio/Vide Interiors, Jan. 1993.

Article "The Battle for the Infobahn is About to Start—Right in Your Living Room," Byron Harmon, Fortune, Aug. 22, 1994, pp. 110–118.

Article "Larry Ellison," Eric Nee, Upside, Sep. 1994. pp. 17–18,22,24,28,30,32–33.

(List continued on next page.)

*Primary Examiner*—Michael Horabik
*Assistant Examiner*—William H. Wilson, Jr.
*Attorney, Agent, or Firm*—Thorpe, North & Western, L.L.P.

[57] ABSTRACT

A system and method for retrofitting appliances for use with an appliance automation system and for augmenting and expanding the function of an existing appliance automation system. A universal transmitter is provided which can receive instructions from a central audio/visual controller or from any instruction issuing appliance automation controller. The universal transmitter is configured for use with a single appliance and can be used with any appliance having an infrared receiver to which it transmits infrared signals. Control signals, issued by a hand-held infrared transmitter or any appliance automation controller which is connected to the signal-carrying bus, direct the universal transmitter to transmit infrared signals to the appliance being controlled. The present invention also senses whether the appliance is in an on or off state and operates to prevent a power on command from being issued if the appliance is already on. A plurality of receivers placed in different rooms in a building or structure are all connected to the signal-carrying bus (preferably the AC wiring bus) and thus convey instructions which they receive to the transmitter(s) and their associated appliance(s).

23 Claims, 7 Drawing Sheets

OTHER PUBLICATIONS

Article "Considering Fiber? Here are Some Things you Should Know," Rick Cook, Electronic House, Jul./Aug. 1994, pp. 6–7.

Article "Integrated Systems" What They Are and Where They Are Heading. by James Keener, Security Technology & Design, May 1994, pp. 6–9.

Newsletter, Electronic House, "The Intelligence Report: A Newsletter for the Home Automation Industry," Electronic House, Mar. 1994.

Article "Fiber–optic Connectors are More Capable, Less Expensive," by Dennis Hess, Electronic Products, Apr. 1994, pp. 25–27.

Article "Catch the Cebus Part II," by W.K. (Bill) Rader, Home Theater Reprint, Apr. 1994.

Article "Where's Home Automation Headed?" by Tricia Parks, Electronic House, p. 6 No date.

Article "The Cabling Cost Curve Turns Toward Fiber," by Stephen Saunders, Data Communications Reprint, Nov. 1993.

Article "Home Automation Standards," Electronic House, Mar./Apr. 1994, pp. 39–50.

Article "NetWorld + Interop Technology Review—Trends and Technologies from the Leading Connectivity Showcase," PC Magazine, May 31, 1994, pp. 59–62, 64, 66, 68, 73.

Article "Copper and Optical Fiber Duke It Out on the Desktop—There's a Good Chance Fiber Will Come Out On Top," by Charles P. Koontz, Lan Times Reprint, Oct. 18, 1993.

Article "CEBus: A New Standard in Home Automation—The First In–Depth Technical Description," by Ken Davidson, Cellular Ink: The Computer Applications Journal, Aug./Sep. 1989, pp. 41–44,46–52.

Article "Double Duty—Home Offices that Serve the Business and Run the Home," by Rick Cook, Electronic House, Jul./Aug. 1994, pp. 46–49,51.

Article Catch the CEBus—Part I, by W.K. (Bill) Rader, Home Theater, Mar. 1994, pp. 65–70.

Article "Fiber vs. Copper in High Data Rate LAN Applications," by the TIA Fiber Optic Division, LAN Section, Mar. 1994.

Article "Take a Tour of the Bright Home," by Ken Davidson, Circuit Cellar Ink: The Computer Applications Journal, Mar. 1992, pp. 14–21.

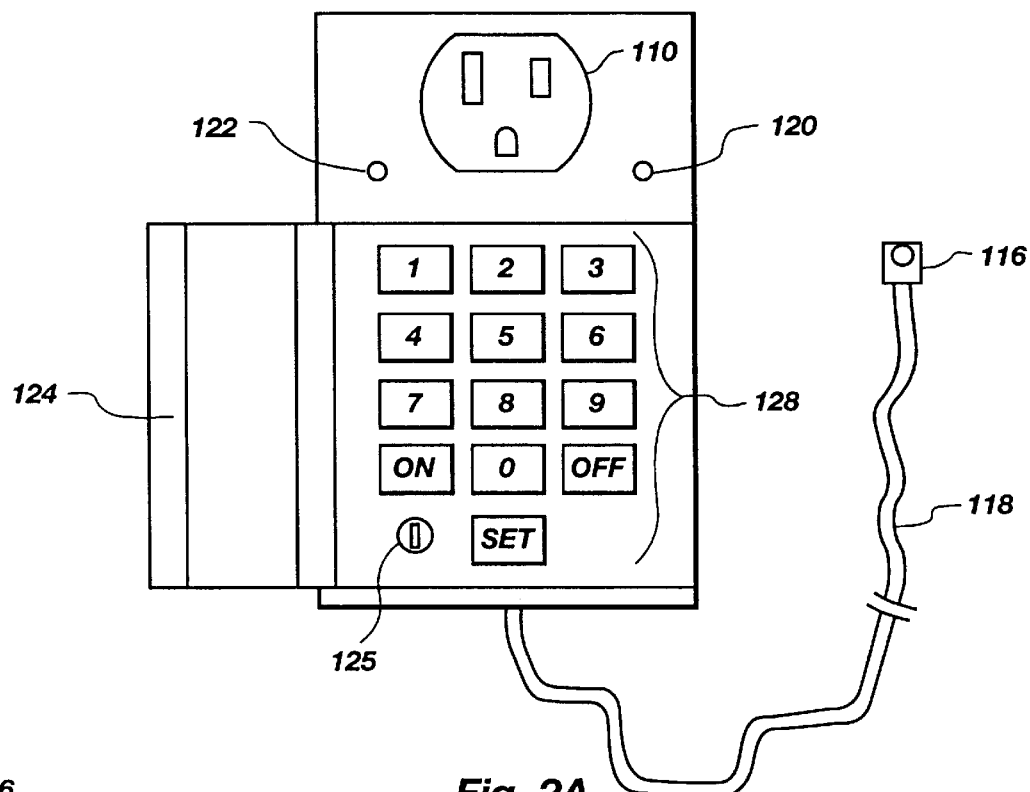
*Fig. 2A*
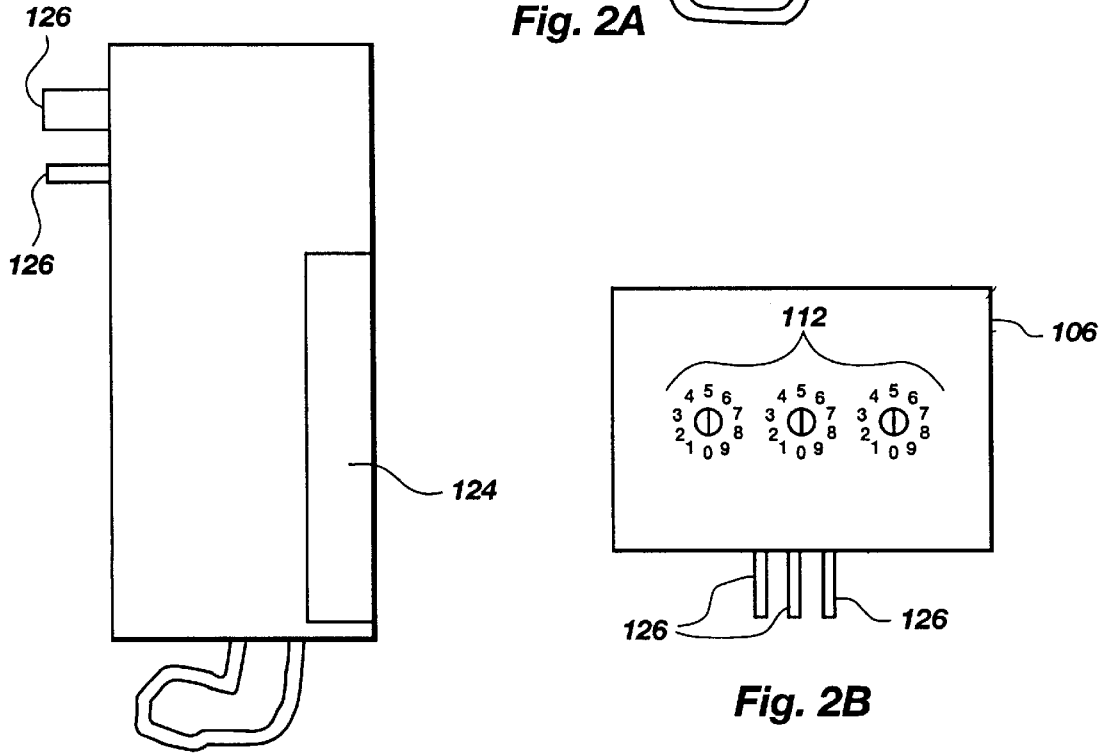
*Fig. 2C*
*Fig. 2B*

AUTOMATED APPLIANCE CONTROL SYSTEM

This application is a continuation of U.S. application Ser. No. 08/326,684, filed Oct. 20, 1994, now abandoned of Lovell B. Ivie et al. for "AUTOMATED APPLIANCE CONTROL SYSTEM".

BACKGROUND

1. The Field of the Invention

This invention relates to apparatus used to communicate commands to electrical appliances from remote locations. More particularly, the present invention relates to appliance automation systems used to control household appliances.

2. The Prior Art

The sophistication and number of features offered by consumer electrical equipment is rapidly increasing. As the number and complexity of electrical equipment increases, it has become more difficult to competently control all of the functions provided by such modern appliances. Consumers are also anticipating the widespread use of appliance automation systems, also commonly referred to as "home automation systems," which allow comprehensive control of a wide variety of appliances from one or more locations in a structure such as a residential structure.

Appliances which users are finding increasingly difficult to control include, but are not limited to, devices such as televisions, video cassette recorders, compact disc players, compact disc changers, laser disc players, audio cassette decks, audio receivers, video receivers, audio and video signal processing equipment, AM/FM tuners, digital audio cassette decks, cable television control boxes, motorized window coverings, motorized skylights, building heating and cooling systems, lighting control systems, computers, as well as other similar devices, all hereinafter may be referred to as "appliances."

As will be appreciated, there are a multitude of appliances already in use which are not compatible with any appliance automation system. Such appliance automation systems include those systems which adhere to promulgated standards such as CEBus®, ECHELON®, SMART HOUSE, MEDIALINK® and D2B® appliance automation standards or any appliance automation standard now available or which may become available in the future. Government and industry action in the near future will likely mandate that newly manufactured appliances provide compatibility with one or more appliance automation standards. Disadvantageously, under the present state of the art, existing appliances will not be able to cooperate with the appliance automation systems which are now being proposed. Moreover, in view of the number of competing and incompatible appliance automation standards, some manufacturers may opt to incorporate features which are compatible only with an appliance automation standard which is different than those compatible appliances in the structure.

Moreover, if industry experts are correct, an explosion in the amount of information which is delivered to a residential or commercial location is about to occur. References to an "information super highway" are raising the expectation that every member of a modern industrialized society will soon have access to the vast amounts of information for education, business, and entertainment. Moreover, the promise is being made that this information will be delivered to both commercial and residential locations in an easy and ready-to-use format.

Unfortunately, the promise of the information super highway may be wasted in many circumstances because of a lack of compatible equipment available for either the residential user or the commercial user. Each of the utility companies, including electric power service providers, telephone service providers, and cable television service providers, are all promising and vying to be the provider of the medium which will convey the information super highway to the multitude of residential and business customers. In order to accommodate the bandwidth needed to carry the data on the information super highway, utility companies are proposing to devote enormous resources to installing fiber-optic media, or other wide bandwidth media, to each structure within its service area. Each of the utility companies are also hoping to provide the hardware which will be used within the structure to receive the information.

In view of the present state of the art, it would be an advance in the art to provide an improved appliance control system which is compatible with appliance automation systems which are already existing or which are installed in the future and which will allow the user to manage the information which is delivered to a structure.

BRIEF SUMMARY AND OBJECTS OF THE INVENTION

In view of the above-described state of the art, the present invention seeks to realize the following objects and advantages.

It is a primary object of the present invention to provide a system and method for retrofitting existing appliances for use with appliance automation systems.

It is also an object of the present invention to provide a system and method for interfacing with appliance automation systems allowing both compatible appliances and non-compatible appliances to be used therewith.

It is a further object of the present invention to provide a wireless control system for an appliance automation system.

It is also an object of the present invention to allow existing appliances without any automation capability to be addressed and controlled by an appliance automation system.

It is another object of the present invention to provide a system and method which replaces many appliance control devices with a single wireless appliance control device.

It is yet another object of the present invention to provide a system and method for allowing control over any appliance in a structure from any location in the structure.

These and other objects and advantages of the invention will become more fully apparent from the description and claims which follow, or may be learned by the practice of the invention.

The present invention provides a system and method for retrofitting appliances for use with an appliance automation system, also sometimes referred to as a home automation system. The present invention also augments and expands the function of an existing appliance automation system.

In accordance with one embodiment of the present invention, a single universal transmitter is provided which can receive instructions from a central audio/visual controller or from any instruction issuing appliance automation controller. The single universal transmitter is configured for use with a single appliance and can be used with any appliance having an infrared receiver to which it transmits infrared signals. It is preferred that the embodiments of the present invention communicate via the AC wiring bus in the structure in compliance with the CEBus® automation standard as will be explained below. Importantly, other communication protocols can also be used in accordance with the present invention.

The described embodiment of the single universal transmitter preferably includes means for receiving a first control signal. The first control signal may be issued by a hand-held infrared transmitter or any appliance automation controller which is connected to the signal-carrying bus. Also preferably included is a means for translating the first control signal into a second control signal and means for emitting the second control signal, which is recognized by the appliance as a command, to an infrared receiver on the appliance, such as audio or video equipment. The means for emitting directs the infrared signal into the infrared receiver on the appliance. Also included is a means for selecting an address for the device so that the single universal transmitter will recognize just those instructions which are addressed to it.

One preferred embodiment of the single universal transmitter also includes means for sensing whether the appliance is in a power active state or a power-inactive state. Thus, the present invention ensures that the power on command is issued to the appliance only when the appliance is in a power-inactive state. Otherwise, in those appliances which do not recognize a discrete power on command and a discrete power off command, but merely toggle between on and off responding to the same command signal, the appliance may turn on when the power off state was desired and vice versa.

The means for sensing whether the appliance is in a power active state preferably includes means for providing AC current to the appliance, such as an AC receptacle, and means for sensing the current drawn by the appliance through the receptacle. A means for comparing the current drawn by the appliance with a predetermined threshold is provided. A means for manually varying the predetermined threshold is also provided. A means for perceptibly indicating to a user when the current drawn by the appliance exceeds the predetermined threshold is also provided so the user can set the predetermined threshold to match the current drawn when the appliance is in a power active state. Means for preventing the issuance of a power on command if the current drawn by the appliance exceeds the predetermined threshold (thus indicating that the appliance is already on) is also preferably included. The issuance of a power off command is similarly inhibited if the appliance is already in its power-inactive state.

In accordance with the present invention, a plurality of receivers can be placed in different rooms in the structure and all the receivers are connected to the signal-carrying bus (preferably the AC wiring bus in the described embodiment) and thus convey instructions which they receive to the universal transmitter(s).

A hand-held transmitter is also included which allows a user to control a wide variety of appliances from any remote location in the structure. The hand-held transmitter preferably comprises an infrared emitter, a plurality of function keys which are programmable to carry out any one of a set of functions, one set of preprogrammed functions for each of the appliances to be controlled, such as audio equipment, video equipment, or any other appliance which may be controlled with an appliance automation system. The hand-held transmitter also includes a display which includes indicia indicating the current function of the function keys.

BRIEF DESCRIPTION OF THE DRAWINGS

In order to better appreciate how the advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 2A–C are front, top, and side views, respectively, of a first embodiment of the present invention.

DETAILED DESCRIPTION OF THE PREFERRED EMBODIMENTS

Reference will now be made to the drawings wherein like components will be provided with like reference designations.

Figure 1:
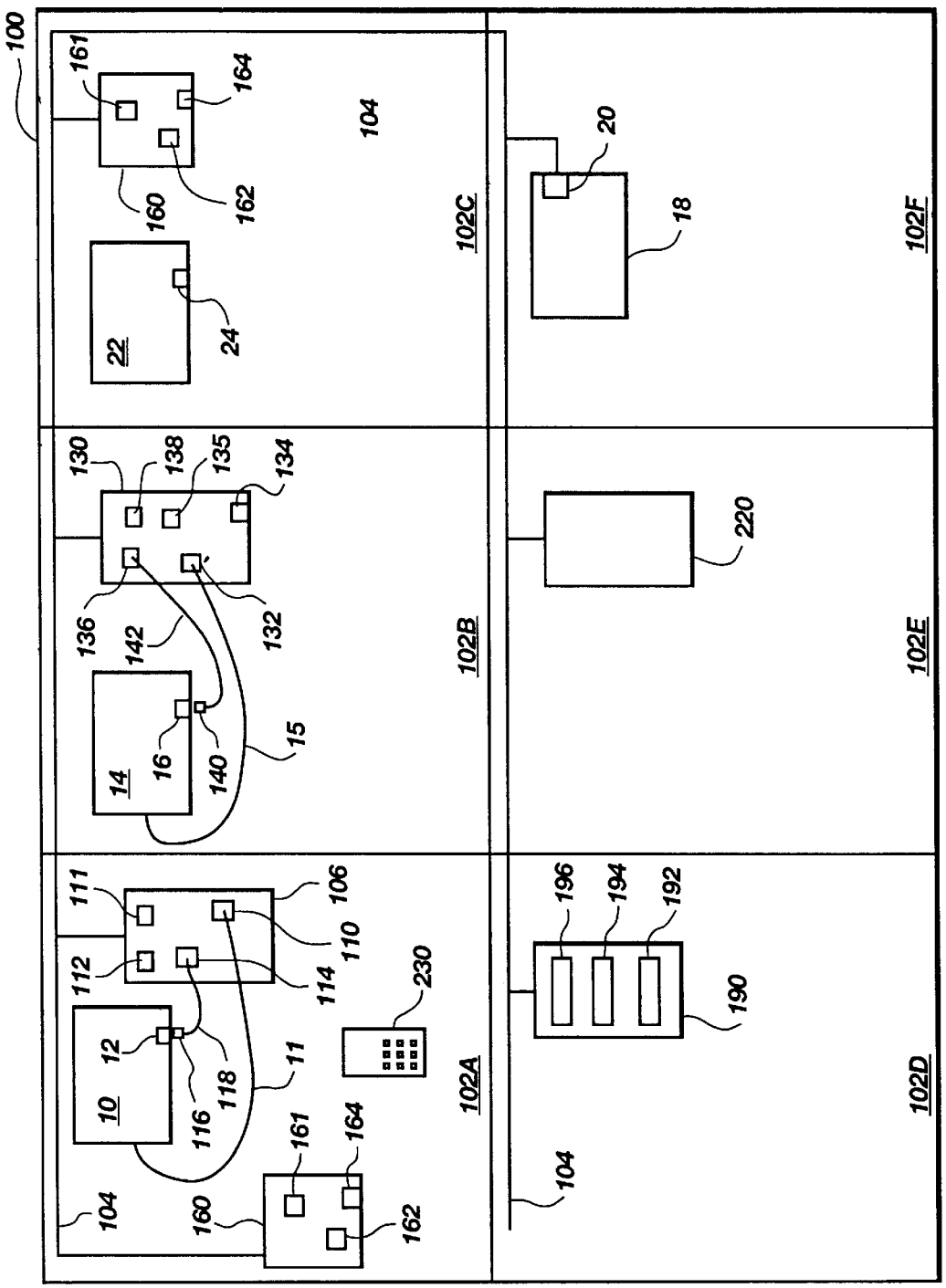
FIG. 1 is a diagrammatic representation of a structure, such as a residential structure, with electrical appliances and embodiments of the present invention located therein.

Reference will first be made to FIG. 1 which is a diagrammatic representation of a structure, generally represented at 100, such as a residential structure, in which are located a plurality of electrical appliances 10, 14, 22, and 18 and representative embodiments of the present invention 106, 130, 160, 190, and 230. Other electrical devices are also represented in FIG. 1 as will be explained shortly.

Also represented in FIG. 1 is a signal conducting bus 104. The signal conducting bus 104 represents one of many different mediums which can be used to allow information to be conveyed from one device in the structure 100 to all other pertinent devices in the structure 100. The signal-carrying bus 104 is presently preferred to be the AC power wiring bus of the structure. In particular, the CEBus® appliance automation standard is adapted to convey information between devices via the AC power bus of the structure 100. It will be appreciated that many other techniques can be used to provide information transfer between the devices of the present invention. For example, mediums such as coaxial cable, twisted pair cable, fiber optic cable, radio frequency transmission, as well as other mediums now known or developed in the future can also be used. The devices and techniques which are necessary to transfer information over an AC power bus, or any other of the mentioned mediums, are known in the industry and those skilled in the art can readily adapt such technologies for implementation in embodiments of the present invention using the information set forth herein. Further information regarding the CEBus® standard can be obtained from the Electronics Industry Association of Washington, D.C.

It is also to understood that the term "structure," as used herein, includes any man-made edifice including those which are not contiguous, such as a number of individual buildings which are separated by large distances. The present invention, however, provides the greatest benefits when applied in a residential dwelling structure comprising a plurality of rooms, also referred to herein as enclosures, and represented in FIG. 1 at 102A–F. Significantly, not only has the industry not answered the problems which the present invention solves but the industry has not even recognized such problems.

Represented in FIG. 1 in enclosure 102A is an appliance 10, for example a television. The appliance 10 includes an infrared receiver 12. The infrared receiver 12 is generally intended to receive coded infrared transmissions from a hand-held transmitter (not illustrated) sold with the appliance 10, often referred to as a "remote control," which sends a modulated/coded infrared signal to the appliance 10 which, when decoded, provides operating commands. As used herein, the term "remote" is intended to refer to any location which is outside of the housing or cabinet of an appliance or other device.

It will be appreciated that the preferred embodiments of the present invention described herein can be utilized to instruct appliances which direct the conveyance of information both within a structure as well as those appliances which direct information into and out of a structure. Thus, the present invention has application with appliances, devices, and equipment described in pending U.S. patent application Ser. No. 08/301,910 filed on Sep. 7, 1994 entitled Electronic Information Interface which is now incorporated herein by reference in its entirety.

As indicated earlier, many appliances are or will be manufactured to be compatible with one or more appliance automation standards, including the CEBus® standard. Other exemplary standards which can benefit from the present invention include those known in the industry as ECHELON®, D2B®, SMART HOUSE and MEDI-ALINK®. The appliance 10 in FIG. 1 is not compliant with the appropriate appliance automation standard and thus the system of the present invention is implemented to provide such compatibility in a retrofit manner and to provide other advantages as well. If appliance 10 were compliant with one or more appliance automation standards, the appliance 10 would preferably recognize and carry out instructions addressed to it via the signal-carrying bus 104.

Represented in FIG. 1, and depicted within enclosure 102A, is a signal universal transmitter 106. The single universal transmitter 106 provides the great advantage of making the appliance 10 compatible with an appliance automation standard, for example the CEBus® standard. Most advantageously, the single universal transmitter 106, as well as other embodiments of the present invention, can be easily installed and operated by the user. The single universal transmitter 106 can be configured to be used with virtually any single appliance which includes an infrared receiver, such as infrared receiver 12, which receives coded infrared signals conveying operating instructions.

The single universal transmitter 106 is connected to the signal-carrying bus 104 from which it receives commands in accordance with a communication standard and, in the example discussed herein, electrical power for its operation. The single universal transmitter 106 includes an AC power receptacle 110 into which an AC power cord 11 of the appliance 10 is inserted. As will be explained shortly, the single universal transmitter 106 senses the AC current drawn by the appliance 10.

Also included in the single universal transmitter 106 are address selection switches 112 which allow a user to set the address at which the single universal transmitter 106 will recognize appliance automation commands present on the signal-carrying bus 104. As will be explained shortly, the single universal transmitter 106 translates the commands received on the signal-carrying bus 104, such as an appliance "power on command," into a modulated infrared signal compatible with the infrared receiver 12 and the appliance 10. The modulated infrared signal is generated by an infrared modulator 114 included in the single universal transmitter 106. The modulated infrared signal is conveyed to the appliance 10 via a cable 118 and an infrared emitter 116 which is preferably located near the appliance's infrared receiver 12. Also included is a processor and memory 111 which includes the interfaces necessary to carry out communications on the signal-carrying bus 104 and other necessary functions as will be appreciated by those skilled in the art.

Reference will now be made to FIGS. 2A–C to provide a more detailed description of the structure and operation of the preferred single universal transmitter 106. As indicated earlier, the single universal transmitter 106 receives instructions via the signal-carrying bus 104 which in the present example is the AC wiring bus upon which instructions are conveyed in accordance with the CEBus® appliance automation standard. The single universal transmitter 106 is installed near the appliance, for example appliance 10 in FIG. 1, which is to be controlled. The single universal transmitter 106 is preferably received into a conventional NEMA compatible receptacle (not shown in the figures) which are found in both residential and commercial structures connected to the AC wiring bus. Extending from the back side of the single universal transmitter 106 are hot, common, and ground prongs all represented at 126 in FIG. 2C. The single universal transmitter 106 includes a power supply which derives the necessary DC voltage needed to power the components of the single universal transmitter 106. It will be appreciated that techniques other than the CEBus® standard can be used to convey instructions to the single universal transmitter 106 and other techniques can also be used to power the single universal transmitter 106.

As represented in FIG. 2A, a NEMA compatible receptacle 110 is included on the single universal transmitter 106. As indicated in FIG. 1, the AC power cord of the appliance 10 is inserted into the receptacle 110 and the appliance derives its AC power therefrom. The single universal transmitter 106 includes a current monitor to sense the current being drawn by the appliance 10. The current monitor is included to determine the "power status" of the appliance 10, that is whether the appliance is turned on or turned off. For example, if the appliance 10 is a video cassette recorder (VCR) the appliance 10 will likely draw a small amount of current even when the appliance 10 is in a "power off" or "power inactive" state in order to operate a clock which is displayed on the appliance 10. Other appliances may similarly draw current even though they are in a power off or power-inactive state.

Since it is essential for the single universal transmitter 106 to unambiguously command the appliance 10 to go to a "power on" state or to a "power off" state, the single universal transmitter 106 must be able to determine which of the two states the appliance 10 is in when the command is to be issued. Importantly, the current monitor allows the single universal transmitter 106 to be used universally, even with appliances which do not utilize a discrete power on signal and a discrete power off signal which is recognized by the infrared receiver 12. Such appliances generally utilize the same infrared signal command which instructs the appliance to toggle between a power on state and a power off state.

In order to effectively determine whether the appliance 10 is in a power on state or in a power off state, the sensitivity of the current monitor can be adjusted using sensitivity adjustment 125. In use, the appliance 10 is turned on and off while the sensitivity adjustment is varied and a power status LED 122 indicates the sensed state of the appliance 10. The power status LED 122 tracks the power state of the appliance 10 and the sensitivity adjustment is varied until the power status LED 122 and the actual power state of the appliance agree with each other. Once adjusted, the single universal transmitter 106 will advantageously "know" the power status of the appliance 10 so that in those appliances without discrete power on and power off commands, a command will never be issued which will cause the appliance to toggle to the power off mode when it was desired to power on the appliance, and vice versa. If the single universal transmitter 106 senses that the appliance 10 is already on when the single universal transmitter 106 receives a "turn on command" for that appliance the issuance of the IR power command to the appliance 10 is inhibited. Further explanation of this feature of the present invention will be described in connection with FIG. 6.

The described arrangement provides a great advance over those previously available control systems for controlling audio/video systems. Such previously available control systems must have the output of the current sensing devices hard wired back to a central control system that, by way of a software program, tracks the power state of all the appliances being controlled. If for some reason, and as regularly occurs with such systems, the power status of an appliance is lost the user ends up with an audio/video system which seems to have a mind of its own; for example going to power on state when the power off state is desired. The described feature of the present invention overcomes this drawback and results in a device which actually senses the power state of the one appliance plugged into the receptacle 110.

As indicated earlier, the single universal transmitter 106 receives instructions via the signal-carrying bus 104 (FIG. 1) and is considered part of an appliance automation system. It is presently preferred that the processor and memory 111 include a CEBus® appliance automation system controller such as that available from Intellon Corporation (Ocala, Fla.) and referred to as a CENode board as known in the art. The use of the described CEBus® controller allows the present invention to integrate into any CEBus® network and it is preferred that communications over the signal-carrying bus 104 be made using the highly reliable spread spectrum communications techniques which are available from those providing CEBus® devices. It will be appreciated, however, that other standards can also be used in accordance with the present invention, both those described herein and those which may otherwise be available now or in the future.

The single universal transmitter 106 is provided with three address selection switches 112 which are represented in FIG. 2B. The address selection switches 112 allow a user to easily set the address of the single universal transmitter 106. It will be appreciated that the three address selection wheels allow sufficient digits to allow a large number of devices to be each have their own unique address among devices controlled by the appliance automation system. It will be appreciated that using the information herein, those skilled in the art can readily implement the described address selection switches 112 or a number of different address selection techniques.

FIG. 2A provides a further representation of the infrared emitter 116 which transmits the modulated infrared signals to the infrared receiver 12 on the appliance 10 (FIG. 1) to cause the appliance 10 to carry out the desired operations. The infrared emitter 116 is wired to the single universal transmitter 106 via a cable 118. The infrared emitter 116 is preferably secured over the infrared receiver 12 on the appliance 10 to block the reception of other infrared signals. For example, the infrared emitter 116 is preferably secured over the infrared receiver 12 by double-sided adhesive tape so that the infrared signals emitted thereby are directed into the infrared receiver 12. The infrared emitter 116 can also be installed inside the appliance, if desired for aesthetic or other reasons, with the necessary installation procedures.

It will be appreciated that the infrared emitter 116 and cable 118 provide very reliable conveyance of infrared signals to the infrared receiver 12 on the appliance 10 and is usable with a large number audio/video devices since most such devices of recent manufacture include an infrared receiver 12. Moreover, it is within the scope of the present invention to provide other devices to communicate between the single universal transmitter 106 and the appliance 10 in accordance with whatever technology may be developed or adopted in the future.

As is known in the industry, many manufacturers configure infrared receivers, such as indicated at 12 in FIG. 1, to recognize and respond to only a unique set of infrared codes. Thus, a manufacturer of an appliance is supposedly able to prevent remote control devices from another manufacturer from working with the appliance. In reality, the necessary infrared codes needed to work with any particular appliance can be readily discovered. The single universal transmitter 106 includes a library of infrared codes for several hundred appliances. The code library can preferably be updated or changed in any manner known in the art, for example by replacing a read-only memory, via a serial port connection (not represented in the figures), or via the appliance automation network.

As shown in FIG. 2A, the single universal transmitter 106 includes a keypad 128. With the keypad 128, a user can enter a number on the keypad 128 to select which set of infrared codes from the library of infrared codes will apply. Thus, a user is supplied with a list of appliances organized by manufacturer and/or model and is instructed to enter the proper number on the keypad 128. Once the number is entered on the keypad 128, the single universal transmitter 106 will look up the infrared code which properly translates the instructions received from the appliance automation network and conveys the proper infrared code to the infrared emitter 116. When the number is being entered on the keypad 128 an LED 120 indicates whether the proper infrared code has been found by the color of the LED 120, different colors representing acceptance of the number, rejection of the number, or general trouble. The LED 120 will also blink when an infrared code is being sent to the infrared emitter 116 to confirm operation.

From the forgoing description, it will be understood that the installation and operation of the single universal transmitter 106 can be readily accomplished. The installation of the single universal transmitter 106 consisting of few major steps, including, plugging the single universal transmitter 106 into the receptacle (not represented) connecting to the AC wiring bus 104, plugging the controlled appliance into the receptacle 110 on the single universal transmitter 106, and setting the current monitor threshold by varying the sensitivity adjustment while cycling the appliance on and off and assuring that the power status LED 122 follows the status of the appliance. After these steps, the user then need only look up from a provided list the manufacturer and model of the appliance and inputting the number on the keypad 128 which corresponds to the set of infrared codes to which the appliance will respond. Finally, the infrared emitter 116 is preferably secured over the appliance's infrared receiver (12 in FIG. 1).

As indicated earlier, the single universal transmitter 106 is responsive to instructions conveyed via the signal-carrying bus (104 in FIG. 1) which acts as communications network for the appliance automation system. As will be appreciated by those skilled in the art, the pertinent instructions can be issued, and the operation of all devices responsive to the appliance automation system coordinated, by an appliance automation network controller 220 depicted at FIG. 1 in enclosure 102E. The appliance automation network controller can be any number of devices available in the industry, for example dedicated devices can be used or a general purpose PC compatible computer with the appropriate interfaces can also be used.

Referring again to FIG. 1, the present invention also allows the user to maintain the convenience of operating the appliance 10 using a hand-held transmitter represented at 230. While the hand-held transmitter 230 is depicted in enclosure 102A, it will be appreciated that the hand-held transmitter can move from enclosure to enclosure (i.e., room to room) as will be explained shortly. Moreover, the present invention allows the user to control not only the appliance 10 using the hand-held transmitter 230 but also any other device, for example computer and communications equipment, responsive to the instructions issued on the signal-carrying bus 104. Thus, in accordance with the present invention, a user can have the benefit of potentially controlling numerous appliances from the hand-held transmitter 230 regardless of where the appliance is located in the structure.

In order to accommodate the hand-held transmitter 230 shown in FIG. 1 a receiver 160 is included. The receiver is connected to the signal-carrying bus 104 which in the present example is the AC wiring bus from which the receiver receives instructions and power necessary for operation. While the receiver 160 is depicted in enclosure 102A, it will be appreciated that a receiver 160 can be placed in any of the enclosures 102A–F or, most advantageously, that a receiver can be placed in each enclosure 102A–F in order to allow operation of the hand-held transmitter 230 in any enclosure. In the example represented in FIG. 1, a receiver 160 is also depicted in enclosure 102C and a receiver/universal transmitter 130 is depicted in enclosure 102B which allows the hand-held transmitter 230 to operate effectively in any of enclosures 102A–C.

Figure 3A:
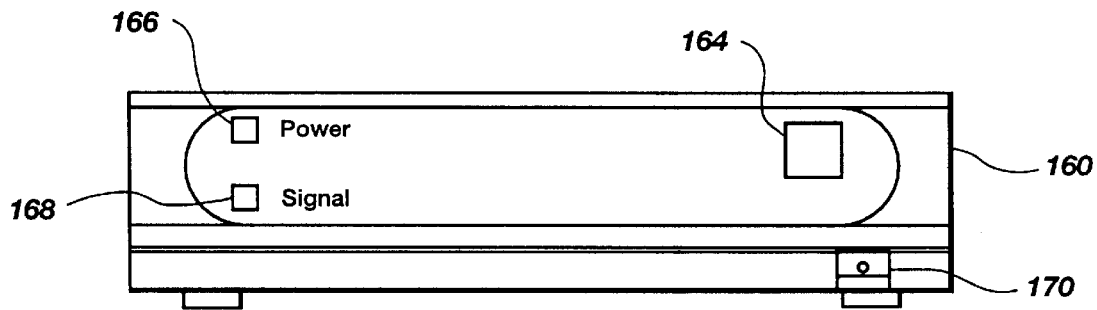
FIGS. 3A–B are front and back views, respectively, of a second embodiment of the present invention.
Figure 3B:
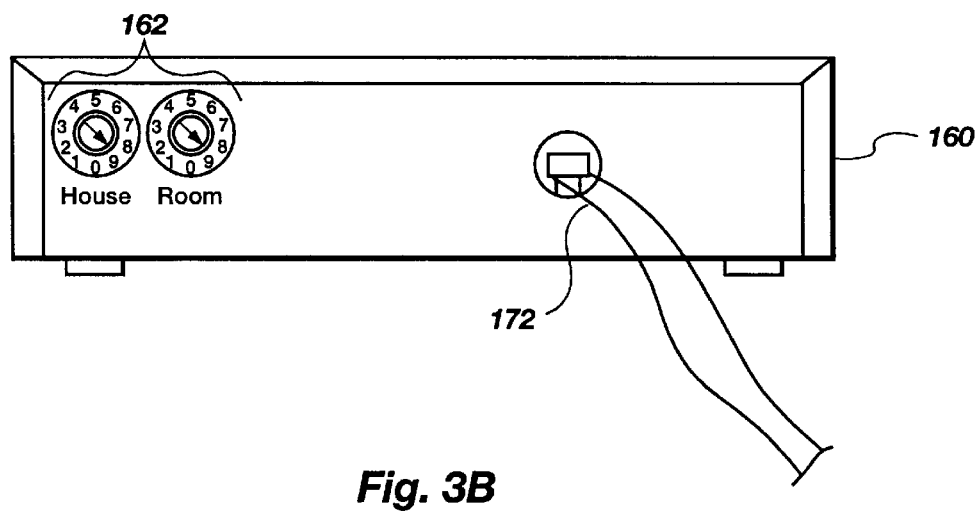

The receiver 160 includes an infrared receiver 164, address selection switches 162, and a processor 161 as may be necessary to communicate with other devices on the appliance automation network and to carry out other required functions. Reference will now also be made to FIGS. 3A and 3B which are front and back views of a preferred embodiment of the receiver 160. The receiver 160 includes a power switch 170, a power indicator LED 166 which illuminates when the receiver 160 is in a power on state, and an infrared signal reception LED 168 which illuminates when an infrared signal from the hand-held transmitter 230 is received.

Also represented in FIG. 3A is another view of the receiver 160. The receiver 160 is preferably configured to receive CEBus® CAL codes as known in the industry and to retransmit such codes on the CEBus® network using a medium such as the signal-carrying bus 104. Other communication protocols can also be used, as will be explained shortly. The processor 161 (FIG. 1) preferably comprises a CENode controller board which utilizes spread spectrum communications technology as is available from Intellon.

Referring next to FIG. 3B, two address selection switches 162 are provided. The address selection switches 162 include only two switches, for example two sixteen position switches, which are used to identify enclosure or room in which the receiver 160 is located. The location of the receiver 160 is transmitted on the signal-carrying bus 104 so that other devices can be made aware of the location of the receiver 160.

The capability of selecting an address for the receiver 160 allows the receiver 160 to be addressed directly to a group of infrared transmission devices for simple point to point control in the case of one central audio/visual source appliance location and multiple reception points as is the case where the control instructions for a source audio/visual appliance being controlled are modulated onto an unused cable television channel by the use of modulator device, such as those available in the industry from Pico Products, Inc. (New York, N.Y.) or the equivalent. Also illustrated in FIG. 3B is a power cord 172 through which the receiver 160 receives electrical power and preferably conveys information onto the signal-carrying bus 104.

Figure 5:
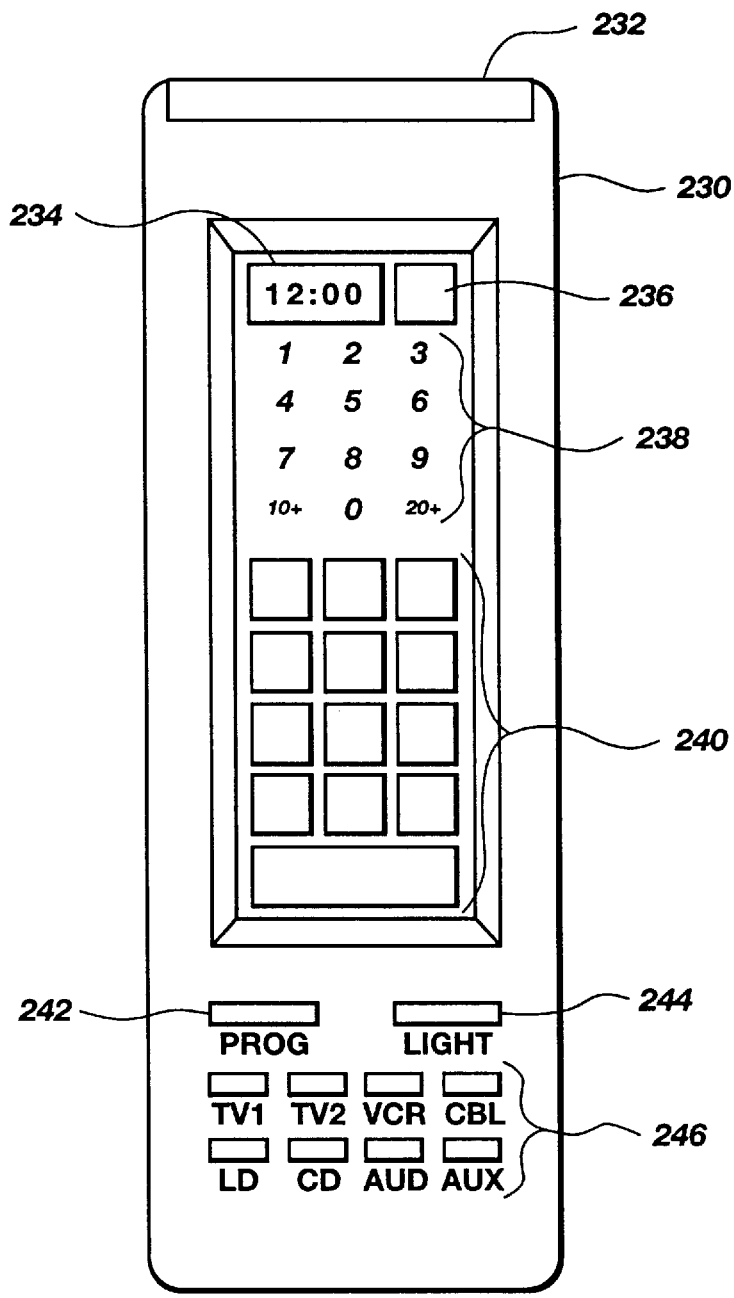
FIG. 5 is a top view of a fourth embodiment of the present invention.
Figure 5D:
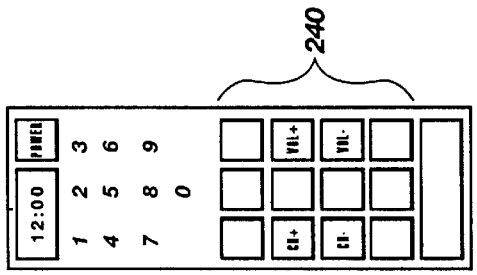
FIGS. 5A–H are top views showing different configurations of the fourth embodiment of the present invention.
Figure 5H:
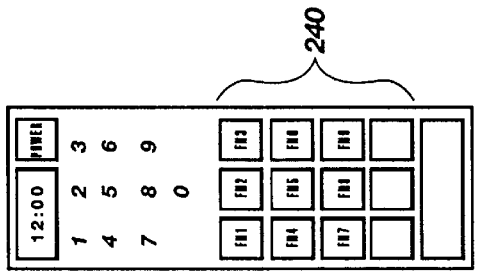
Figure 5C:
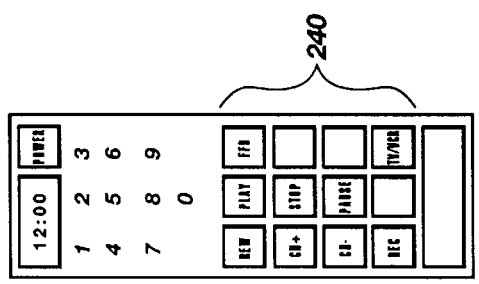
Figure 5G:
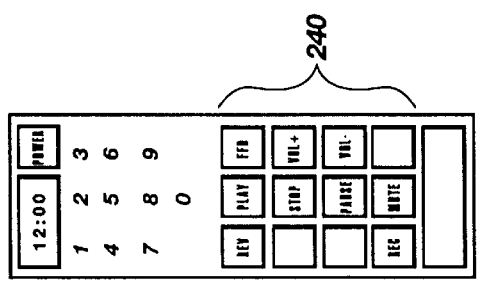
Figure 5B:
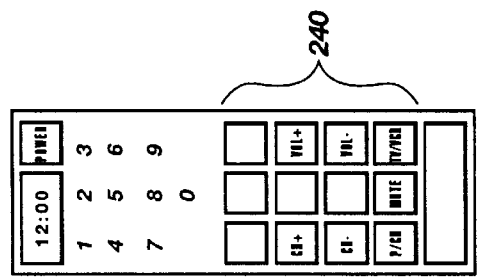
Figure 5F:
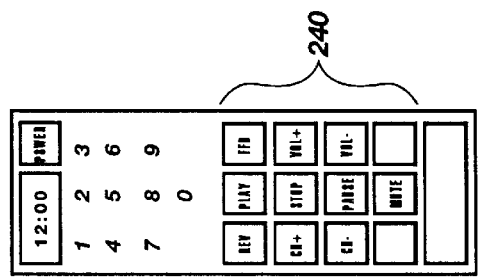
Figure 5A:
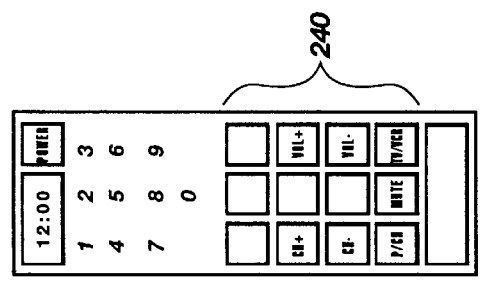
Figure 5E:
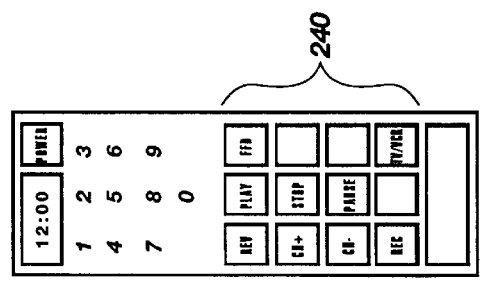

Reference will next be made to FIG. 5 which is a more detailed top view of the hand-held transmitter 230. The hand-held transmitter 230 includes a battery (not represented) which powers the hand-held transmitter 230. The hand-held transmitter 230 includes an infrared emitter 232 as can be selected from those available in the art. An LCD date/time display 234 is also provided. While it is preferred to utilize infrared radiation to communicate between the hand-held transmitter 230 and the receiver 160, it will be appreciated that other mediums and technologies can be used within the scope of the present invention.

Also represented in FIG. 5 are a number of information providing displays and input interfaces as will now be explained. The preferred hand-held transmitter 230 described herein includes eight device selection switches 246: TV1 (Television 1); TV2 (Television 2); VCR (Video cassette recorder); CBL (Cable television box); LD (Laser disc player); CD (Compact disc player); AUD (Audio amplifier); and AUX (Auxiliary device). The hand-held transmitter 230 includes a processor and associated memory which are programmed to select an appropriate set of infrared codes in accordance with which of the eight device selection switches have been chosen. A programming key 242 is provided to allow the hand-held transmitter 230 to receive programming from an external source through a plug (not illustrated) and to set the LCD date/time display 234. A light key 244, when activated, causes the various displays to be illuminated.

The hand-held transmitter 230 also includes a dedicated power key 236 which when depressed causes the infrared emitter 232 to emit a modulated infrared signal which, when perceived by the receiver 160 (FIGS. 1 and 3A–B) and dispatched on the signal-carrying bus 104, is interpreted as a "power off" or "power on" instruction to the appropriate device. The hand-held transmitter 230 also includes a set of dedicated numeric keys 238. Also included in the hand-held transmitter 230 is an LCD touch screen 240. The LCD touch screen includes a transparent touch screen, such as one provided by an ITO coating, which is sensitive to the touch of a user and forms a plurality of keys. Under the transparent touch screen is an LCD display which changes in accordance with which one of the device selection switches 246 has been chosen. The LCD display exhibits appropriate alpha/numeric characters or icons to indicate to the user the function which has been assigned to the particular key of the touch screen. The preferred touch screen and the LCD display can be selected from those available in the industry.

FIGS. 5A–H illustrate exemplary configurations of the touch screen LCD 240. Each of FIGS. 5A–H show a different configuration for the touch screen LCD 240 showing the appropriate functions assigned to each key in accordance with the device which has been selected via device selection keys (246 in FIG. 5). It will be appreciated that the functions represented in FIGS. 5A–H are merely exemplary and different or additional functions may also be utilized. Provided below in Table A is a list of the devices and the figure which illustrates corresponding touch screen LCD 240.

TABLE A

| Device | Figure |
|---|---|
| TV1 | 5A |
| TV2 | 5B |
| VCR | 5C |
| CBL | 5D |
| LD | 5E |
| CD | 5F |
| AUD | 5G |
| AUX | 5H |

It will be appreciated that many variations on those displays represented in FIGS. 5A–H can be implemented within the scope of the present invention. Moreover, hand-held transmitters, as well as other similarly functioning devices, can be implemented within the scope of the present invention which includes only dedicated function keys. It will be further appreciated that the hand-held transmitter 230 can be programmed to control many more devices than represented in FIGS. 5A–H. Furthermore, the hand-held transmitter 230 can be configured to allow downloading of infrared codes into its internal memory (via infrared or electrical link) to allow the infrared codes for a large number of devices to be stored. Still further, it is within the scope of the present invention to allow the user to program the hand-held transmitter 230 so that text or icons can be displayed for particular devices.

It is preferred that the hand-held transmitter 230, the single universal transmitter 106, and the receiver 160 all communicate using the CEBus® CAL language as specified in the EIA IS60 Standard, which is now incorporated herein by reference in its entirety including all promulgated drafts and revisions thereof as of the date this specification is filed. It will be understood that other standards and techniques can also be used for communications between the devices described herein.

For example, the hand-held transmitter 230 can utilize a set of numeric codes which will be received by the receiver 160 and placed on the signal-carrying bus 104 where they will be intercepted by an audio/visual subsystem controller represented at 190 in FIG. 1. The audio/visual subsystem controller 190 preferably includes a keyboard 192, a display 194, and a processor with the necessary interface circuitry for whatever appliance automation standard is being used and to communicate with the signal-carrying bus 104. The audio/visual subsystem controller 190 can be used alone to receive, translate, and send information to other devices along the signal-carrying bus 104 if no appliance automation network controller 220 (depicted at FIG. 1 in enclosure 102E) is present. Alternatively, the audio/visual subsystem controller 190 can be used in combination with the appliance automation network controller 220. It will be appreciated that the designation "audio/visual" is used since audio/visual appliances are most preferred for use with the present invention but other types of appliances can also benefit from the present invention. Thus, when the CEBus® CAL language is used, any CEBus® based whole house appliance controller can be used to send instructions to the devices of the present invention. When the described numeric codes, or their equivalent are used, the audio/video subsystem controller 190 can be used alone.

An exemplary numeric code which can be used (rather than the CEBus® CAL language) can utilize a plurality of code pages with the numeric codes which will be transmitted as infrared codes for each selected device being found on an individual code page. For example, the numeric infrared codes for the TV1 code page might start at 2 for "power on," 3 for "power off," and so forth, until the last function, for example, 42 for "PIP move" was reached. The code page for TV2 would begin at 43 for "power on," 44 "for power off," and so on. In this manner an extremely simple set of infrared codes are generated for those applications where the expense of strict compliance with an appliance automation language is not necessary. Such a numeric code also prevents interference with other devices which communicate using infrared transmissions. By using numeric codes as described, each code page stored in the hand-held transmitter 230 has different numbers assigned to the keys 240 in FIG. 5 and eliminates the requirement of actual appliance/device addressing as would be required if the CEBus® CAL language were used. Using the described numeric codes, the appliance for which the code is intended is inherent in the code thus any appliance or device on the signal-carrying bus 104 will know which codes are intended for it.

For example, codes for TV1 can start at 2 and end at 19 so if the single universal transmitter 106 associated with TV1 "hears" code 94 the single universal transmitter 106 won't react since the code falls outside it's programmed range. However, if code 7 were conveyed on the signal-carrying bus 104 then the single universal transmitter 106 would send whatever infrared code that corresponds to that code.

Using the described numeric codes, the hand-held transmitter 230 also includes one or more code pages dedicated to "system functions" or functions that invoke macros which have been programmed into the audio/video subsystem controller 190. These code pages would have keys labeled "start show," "intermission," "end show," "VCR show," "laser disk show," and so forth as desired. The codes sent from these code pages would be outside the codes described above and would be received by the audio/visual subsystem controller which would then send out the discrete commands to the individual appliances as directed by macros programmed by the user to carry out the desired functions.

Exemplary numeric codes for the devices indicated in FIG. 5, as well as for additional devices, are set forth in Appendix A hereto which is incorporated herein by reference in its entirety.

Reference will next be made again to FIG. 1 wherein is represented a combined universal transmitter/receiver 130 depicted within enclosure 102B. The combined universal transmitter/receiver 130 combines the functions of the single universal transmitter 106 and the receiver 160. Thus, the combined universal transmitter/receiver 130 further provides the great advantage of making an appliance 14 compatible with an appliance automation standard, for example the CEBus® standard. Furthermore, as with other embodiments described herein, the combined universal transmitter/receiver 130 can be easily installed and operated by the user. The combined universal transmitter/receiver 130 can be configured for use with virtually any appliance which includes an infrared receiver, such as infrared receiver 16, which receives coded infrared transmissions conveying operating instructions.

The combined universal transmitter/receiver 130 is connected to the signal-carrying bus 104 from which it receives instructions in accordance with an appliance automation standard and, in the examples discussed herein, electrical power for its operation. An infrared emitter 140 is also connected to an infrared modulator 136 via a cable.

Reference will now be made to FIGS. 1 and FIGS. 4A–C for a more detailed explanation of the combined universal transmitter/receiver 130. The combined universal transmitter/receiver 130 includes an AC power receptacle 132 (FIG. 4B) into which an AC power cord 15 of the appliance 14 is inserted. As was explained in connection with the single universal transmitter 106, the combined universal transmitter/receiver 130 senses the AC current drawn by the appliance 10 in order to determine the power status of the appliance 14.

Still referring to FIG. 1, the combined universal transmitter/receiver 130 includes a current monitor to sense the current being drawn by the appliance 104. The current monitor of the combined universal transmitter/receiver 130 functions similarly to the current monitoring feature of the single universal transmitter 106. Since it is essential for the combined universal transmitter/receiver 130 to unambiguously command the appliance 14 to go to a "power on" mode or to a "power off" mode, the combined universal transmitter/receiver 130 must be able to determine which of the two states the appliance 14 is in when the command is to be issued. Importantly, the current monitor allows the combined universal transmitter/receiver 130 to be used universally, even with appliances which do not utilize a discrete power on signal and a discrete power off signal which is recognized by the infrared receiver 16.

Figure 4A:
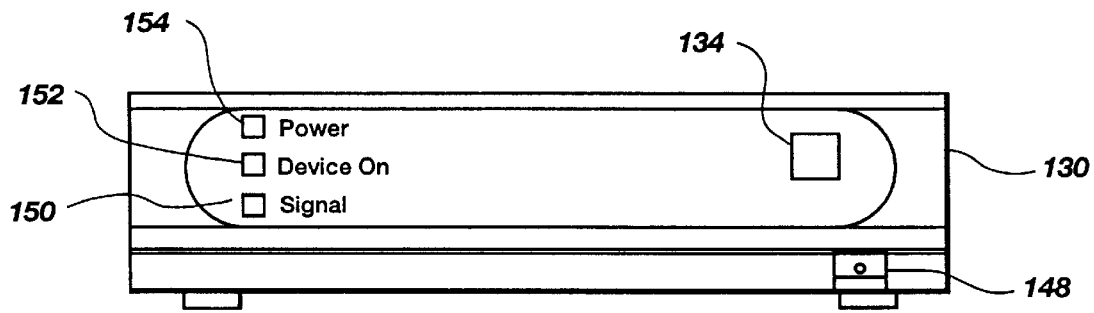
FIGS. 4A–C are front, back, and top views, respectively, of a third embodiment of the present invention.
Figure 4B:
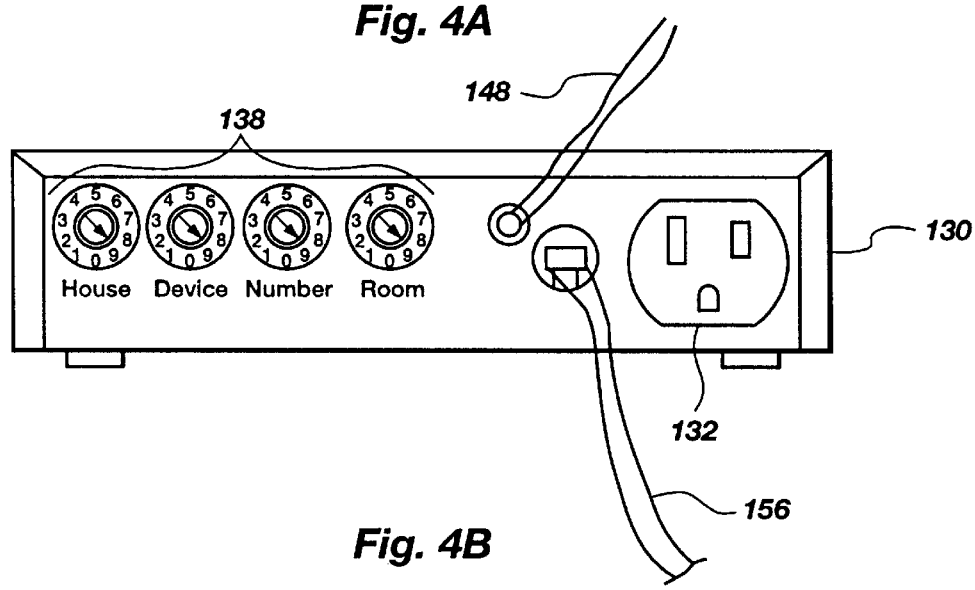
Figure 4C:
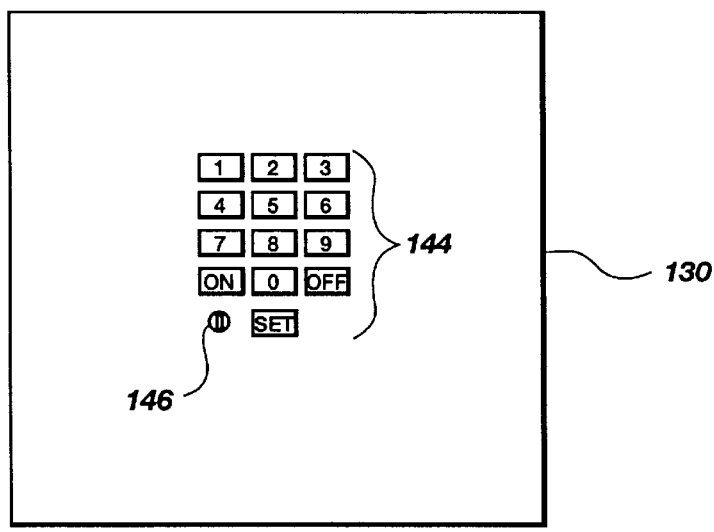

In order to effectively determine whether the appliance 14 is in a power on mode or in a power off mode, the sensitivity of the current monitor can be adjusted using sensitivity adjustment 146 represented in the top view of FIG. 4C. As explained in connection with the single universal transmitter 106 (FIGS. 2A–C), the appliance 14 (FIG. 1) is turned on and off while the sensitivity adjustment is varied and a power status LED 152 represented in the front view of FIG. 4A indicates the sensed state of the appliance 10. The power status LED 152 tracks the power status of the appliance 14 and the sensitivity adjustment 146 is varied until the power status LED 152 and the actual power state of the appliance 14 agree with each other. Once adjusted, the combined universal transmitter/receiver 130 will advantageously know the power state of the appliance 14 so that in those appliances without discrete power on and power off commands, a command will never be issued which will cause the appliance to toggle to the power off mode when it was desired to power on the appliance, and vice versa. If the combined universal transmitter/receiver 130 senses that the appliance 14 is already on when the combined universal transmitter/receiver 130 receives a "turn on command" for that appliance the issuance of the infrared signal representing the "power on" command to the appliance 14 is inhibited.

Referring now to FIG. 4B, also included in the combined universal transmitter/receiver 130 are address selection switches 138 which allow a user to set the address at which the combined universal transmitter/receiver 130 will recognize appliance automation commands present on the signal-carrying bus 104. The combined universal transmitter/ receiver 130 includes four address selection switches 138 which, as preferred in the CEBus® automation system, are designated as "house," "device," "number," and "room" but more or fewer address selection switches can also be used in accordance with the present invention and in compliance with other appliance automation system.

As indicated, the combined universal transmitter/receiver 130 receives instructions via the signal-carrying bus 104 which in the present example is the AC wiring bus upon which instructions are conveyed preferably in accordance with the CEBus® appliance automation standard. The combined universal transmitter/receiver 130 includes a processor and interface which allows communication with the signal-carrying bus 104, preferably in accordance with the CEBus® appliance automation standard.

The combined universal transmitter/receiver 130 is installed near the appliance, for example appliance 14 in FIG. 1, which is to be controlled. The power cord (partially shown in FIG. 4B at 156) of the combined universal transmitter/receiver 130 is preferably received into a conventional NEMA compatible receptacle (not shown in the figures) which is found in both residential and commercial structures connected to the AC wiring bus. The combined universal transmitter/receiver 130 includes a power supply which derives the necessary DC voltage needed to power its internal components.

Referring again to FIG. 1, the combined universal transmitter/receiver 130 receives instructions via the signal-carrying bus 104 and is recognized as part of any existing appliance automation system. It is presently preferred that the single universal transmitter 106 include a processor 135, which preferably includes a CEBus® appliance automation system controller such as that available from Intellon Corporation and referred to as a CENode board in the art.

FIG. 4A illustrates a power switch 148 and an LED 154 which shows when the combined universal transmitter/receiver 130 is operating. Also represented in the front view of FIG. 4A is an infrared signal reception LED 150 which illuminates when an infrared receiver 134 recognizes an infrared signal.

As represented in FIG. 1, the combined universal transmitter/receiver 130 includes an infrared emitter 140 which transmits a modulated infrared signal to the infrared receiver 16 on the appliance 14 to cause the appliance 14 to carry out the desired operations. The infrared emitter 140 is wired to the combined universal transmitter/receiver 130 via a cable 148. As explained in connection with the infrared emitter 116, the infrared emitter 140 is preferably secured over the infrared receiver 16 on the appliance 14 to block the reception of other infrared signals and also provides the same advantages as previously explained.

As in the case of the single universal transmitter 106, the combined universal transmitter/receiver 130 includes a library of infrared codes for several hundred appliances. The code library can preferably be updated or changed in any of the ways known in the art, for example by replacing a read-only memory, via a serial port connection (not represented in the figures), or via the appliance automation network. As shown in the top view of FIG. 4C, combined universal transmitter/receiver 130 includes a keypad 144 whereby a user can enter a number on the keypad 128 to select which set of infrared codes from the library of infrared codes will apply as explained earlier. Once the proper number is entered on the keypad 128, the combined universal transmitter/receiver 130 will look up the proper infrared code which properly translates from the instructions received from the appliance automation network and convey the proper infrared code to the infrared emitter 140 (FIG. 1).

From the forgoing description, it will be understood that the installation and operation of the combined universal transmitter/receiver 130 can be readily accomplished. The installation of the combined universal transmitter/receiver 130 consists of a few major steps including: plugging the combined universal transmitter/receiver 130 into the receptacle (not represented) connecting to the AC wiring bus, plugging the controlled appliance into the receptacle 132 on the combined universal transmitter/receiver 130, setting the current monitor threshold by varying the sensitivity adjustment while cycling the appliance on and off and assuring that the power status LED 152 follows the status of the appliance, and inputting the proper number on the keypad 144 which corresponds to the set of infrared codes to which the appliance will respond. A final major step involves the infrared emitter 140 being secured over the appliance's infrared receiver (16 in FIG. 1). The combined universal transmitter/receiver 130 is responsive to instructions received from the hand-held transmitter 230 (FIG. 5) and those conveyed via the signal-carrying bus (104 in FIG. 1). It is also within the scope of the present invention to include the components necessary to control a plurality of appliances from a single device such as the combined universal transmitter/receiver provided with a plurality of outlets and infrared emitters.

It will also be appreciated that the embodiments of the present invention which have been described herein can be adapted to control any appliances which are compatible with the appliance automation system in use. For example, the appliance 18 which is depicted in enclosure 102F includes a CENode controller board 20 and the hand-held transmitter 230 can be configured to control the appliance 18.

Figure 6:
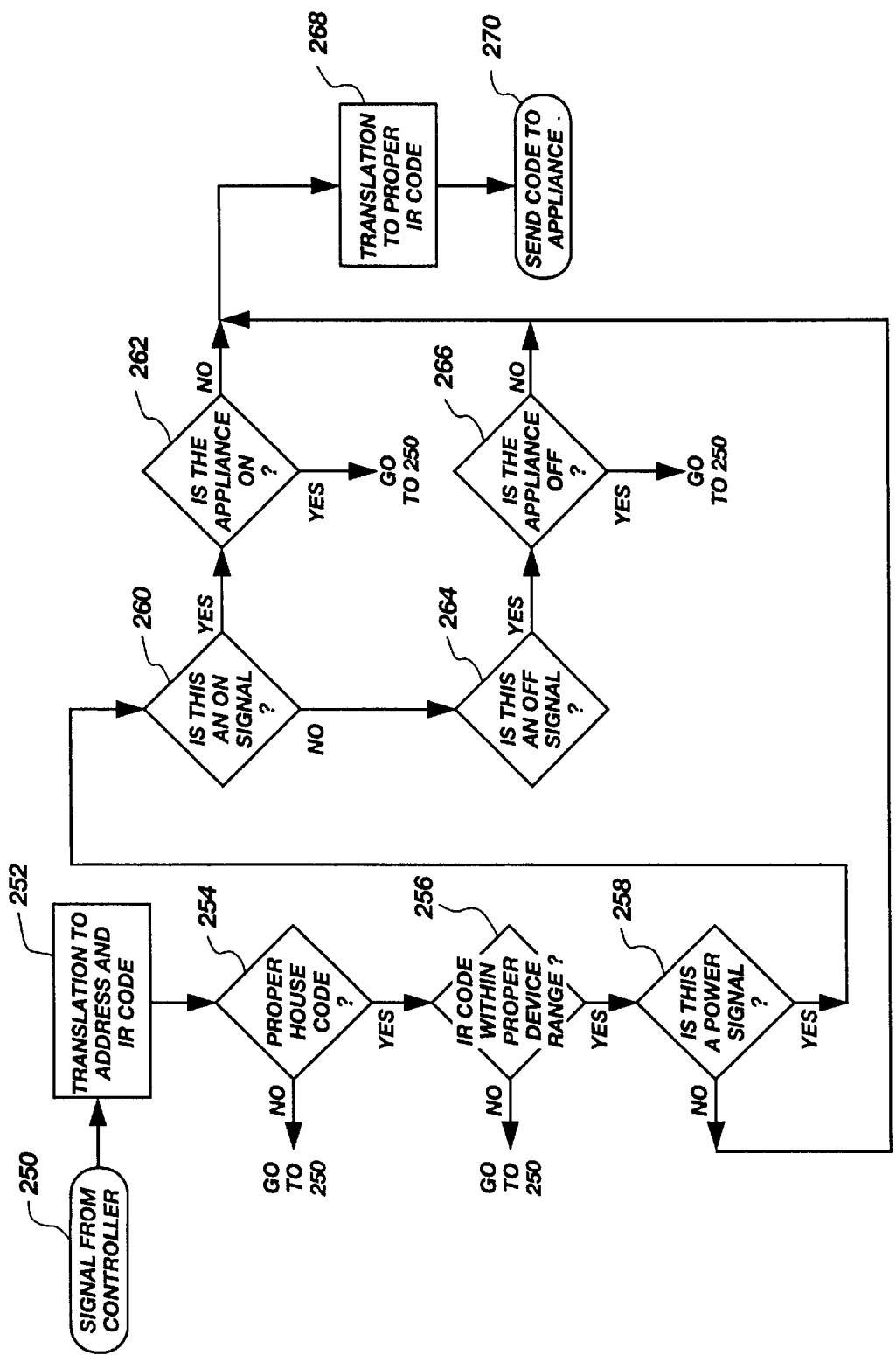
FIG. 6 is a flow chart representing one preferred method of the present invention.

Reference will next be made to FIG. 6 which is a flow chart representing one preferred method carried out by the single universal transmitter 106 and combined universal transmitter/receiver 130 described herein. Rather than using the CEBus® CAL language, the method of FIG. 6 utilizes addressing protocol such as that explained in connection with Appendix A. It is to be understood that the described method is merely exemplary of the methods of the present invention.

The flow chart of FIG. 6 begins at step 250 whereat a signal is received from the appliance automation network, for example the signal-carrying bus 104 represented in FIG. 1. The signal is then translated to an address and an infrared code at step 252. At step 254 the address is examined to determine if it contains the proper "house code." If the address does not contain the proper house code, the method ends until another signal is received at step 250. If the address contains a proper house code, then it is determined if the infrared code is within the proper range at step 256. If the signal does not contain a command within the proper code range, the method ends until another signal is received at step 250.

If the infrared code is within the proper range, then it is determined if the signal is a power signal at step 258. If the signal is a power signal then it is determined if the signal is a power on signal at step 260 and if so the method proceeds to step 262 where it is determined if the appliance is already on and if not the method proceeds to step 268. If the appliance is already on, the method ends until another signal is received at step 250. If it is determined at step 260 that the power signal is not a power on signal, it is confirmed that the signal is a power off signal at step 264. If the power signal is a power off signal, it is determined if the appliance is already off and if not the method proceeds to step 268. If the appliance is already off, the method ends until another signal is received at step 250. At step 258, if it is determined that the signal is not a power signal then the method goes directly to step 268. At step 268 the signal is translated to the proper infrared code for the appliance and the infrared code is then sent to the appliance via the infrared emitter (116 and 232 in FIG. 1).

In view of the foregoing, it will be appreciated that the present invention provides a system and method for retrofitting existing appliances for use with appliance automation systems and also provides a system and method for interfacing with appliance automation systems allowing both compatible appliances and non-compatible appliances to be used therewith. The present invention also provides a wireless control system for an appliance automation system and allows existing appliances without any automation capability to be addressed and controlled by an appliance automation system. Moreover, the present invention provides a system and method which replaces many appliance control devices with a single wireless appliance control device and allows control over any appliance in a structure from any location in the structure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX A

| Command # | Device Command Name | Command # | Device Command Name |
|---|---|---|---|
| | TV1 | | TV2 |
| 2 | TV On | 20 | TV On |
| 3 | TV Volume Up | 21 | TV Volume Up |
| 4 | TV Volume Stop | 22 | TV Volume Stop |
| 5 | TV Set Volume (%) | 23 | TV Set Volume (#) |
| 6 | TV Volume Down | 24 | TV Volume Down |
| 7 | TV Channel Up | 25 | TV Channel Up |
| 8 | TV Channel Down | 26 | TV Channel Down |
| 9 | TV Select Input (#) (ant, Video, Cable1, C | 27 | TV Select Input (#) (ant, Video, Cable1,C) |
| 10 | TV Select Video Mode (#) (NTSC, SNTSC, HDT) | 28 | TV Select Video Mode (#) (NTSC, SNTSC, HDT) |
| 11 | TV Select Audio Mode (#) | 29 | TV Select Audio Mode (#) |

APPENDIX A-continued

| Command # | Device Command Name | Command # | Device Command Name |
|---|---|---|---|
| | (stereo, mono, su) | | (stereo, mono, su) |
| 12 | TV Set Channel (#) | 30 | TV Set Channel (#) |
| 13 | TV Select PIP Channel (#) | 31 | TV Select PIP Channel (#) |
| 14 | TV Deselect PIP | 32 | TV Deselect PIP |
| 15 | TV Mute | 33 | TV Mute |
| 16 | TV Unmute | 34 | TV Unmute |
| 17 | TV off | 35 | TV off |
| 18 | TV Set D (D) T (T) | 36 | TV Set D (D) T (T) |
| | CAB1 | | VCR1 |
| 182 | CAB On | 262 | VCR On |
| 183 | CAB Select Input (#) | 263 | VCR Fast Forward |
| | (cable1, cable2, etc) | 264 | VCR Rewind |
| 184 | CAB Set Channel (#) | 265 | VCR Select Input (#) |
| 185 | CAB Channel Up | | (ant, video, cable1) |
| 186 | CAB Channel Down | 266 | VCR Set Channel (#) |
| 187 | CAB Off | 267 | VCR Channel Up |
| 188 | CAB Set D (D) T (T) | 268 | VCR Channel Down |
| | | 269 | VCR Select VCR tuner |
| | | 270 | VCR Select other tuner |
| | | 271 | VCR Play |
| | TUN1 | 272 | VCR Stop |
| 422 | TUN On | 273 | VCR Start Record Channel |
| 423 | TUN Off | | (#) at (time) |
| 424 | TUN Set Channel (freq) | 274 | VCR Stop Record at (time) |
| 425 | TUN Select Preset (#) | 275 | VCR Off |
| 426 | TUN Seek | 276 | VCR Set D (D) T (T) |
| 427 | TUN Scan | | |
| 428 | TUN Step Up Preset | | |
| 429 | TUN Step Down Preset | | |
| 430 | TUN Select AM | | SSP1 |
| 431 | TUN Select FM | 1012 | SSP On |
| 432 | TUN Set D (D) T (T) | 1013 | SSP Off |
| | | 1014 | Volume Up |
| | | 1015 | SSP Volume Stop |
| | | 1016 | SSP Set Volume (%) |
| | AMP1 | 1017 | SSP Volume Down |
| 1232 | AMP On | 1018 | SSP Select Mode (#) |
| 1233 | AMP Off | 1019 | SSP Select Input (#) |
| 1234 | AMP Zone (#) Volume Up | 1020 | SSP Select Loudness |
| 1235 | AMP Zone (#) Volume Stop | 1021 | SSP Deselect Loudness |
| 1236 | AMP Zone (#) Set Volume (%) | 1022 | SSP Increase Treble |
| 1237 | AMP Zone (#) Volume Down | 1023 | SSP Decrease Treble |
| 1238 | AMP Zone (#) Select Input (#) | 1024 | SSP Increase Bass |
| | | 1025 | SSP Decrease Bass |
| 1239 | AMP Zone (#) Select Loudness | 1026 | SSP Balance Left |
| | | 1027 | SSP Balance Right |
| 1240 | AMP Zone (#) Deselect Loudness | 1028 | SSP Balance Front |
| | | 1029 | SSP Balance Rear |
| 1241 | AMP Zone (#) Increase Treble | 1030 | SSP Mute |
| | | 1031 | SSP Unmute |
| 1242 | AMP Zone (#) Decrease Treble | 1032 | SSP Set D (D) T (T) |
| 1243 | AMP Zone (#) Increase Bass | | |
| 1244 | AMP Zone (#) Decrease Bass | | |
| 1245 | AMP Zone (#) Mute | | VDP1 |
| 1246 | AMP Zone (#) Balance Left | 1442 | VDP On |
| 1247 | AMP Zone (#) Balance Right | 1443 | VDP Off |
| 1248 | AMP Zone (#) Balance Front | 1444 | VDP Scan Forward |
| 1249 | AMP Zone (#) Balance Rear | 1445 | VDP Scan Backwards |
| 1250 | AMP Zone (#) Unmute | 1446 | VDP Select Input (#) |
| 1251 | AMP Zone (#) Set D (D) T (T) | | (ant, video, cable1,) |
| | | 1447 | VDP Select Disk Side (#) |
| | | 1448 | VDP Set Channel (#) |
| | | 1449 | VDP Play |
| | AUX1 | 1450 | VDP Stop |
| 2402 | Function 1 | 1451 | VDP Pause |
| 2403 | Function 2 | 1452 | VDP Unpause |
| 2404 | Function 3 | 1453 | VDP Open |
| 2405 | Function 4 | 1454 | VDP Close |
| 2406 | Function 5 | 1455 | VDP Select VDP Tuner |
| 2407 | Function 6 | 1456 | VDP Select other Tuner |

APPENDIX A-continued

| Command # | Device Command Name | Command # | Device Command Name |
|---|---|---|---|
| 2408 | Function 7 | 1457 | VDP Set D (D) T (T) |
| 2409 | Function 8 | | |
| 2410 | Function 9 | | |
| 2411 | Function 10 | | |
| | CDP1 | | CASS 1 |
| 542 | CDP On | 1612 | CASS On |
| 543 | CDP Off | 1613 | CASS Off |
| 544 | CDP Select Disk (#) | 1614 | CASS Fast Forward |
| 545 | CDP Select Track (#) | 1615 | CASS Rewind |
| 546 | CDP Select Random | 1616 | CASS Play |
| 547 | CDP Seek Forward | 1617 | CASS Pause |
| 548 | CDP Seek Backward | 1618 | CASS Unpause |
| 549 | CDP Scan | 1619 | CASS Stop |
| 550 | CDP Open | 1620 | CASS Select NR Mode (#) |
| 551 | CDP Close | | (Dolby A,B,C, etc) |
| 552 | CDP Play | 1621 | CASS Select Line Input |
| 553 | CDP Pause | 1622 | CASS Deselect Line Input |
| 554 | CDP Unpause | 1623 | CASS Select Mic Input |
| 555 | CDP Stop | 1624 | CASS Deselect Mic Input |
| 556 | CDP Set D (D) T (T) | 1625 | CASS Start Record |
| | | 1626 | CASS Stop Record |
| | | 1627 | CASS Deck A Fast Forward |
| | | 1628 | CASS Deck A Rewind |
| | RVCR1 | 1629 | CASS Deck A Play |
| 702 | RVCR On | 1630 | CASS Deck A Pause |
| 703 | RVCR Off | 1631 | CASS Deck A Unpause |
| 704 | RVCR Volume Up | 1632 | CASS Deck A Stop |
| 705 | RVCR Volume Stop | 1633 | CASS Deck A Select Line Input |
| 706 | RVCR Set Volume (%) | | |
| 707 | RVCR Volume Down | 1634 | CASS Deck A Deselect Line |
| 708 | RVCR Set Channel (freq) | 1635 | CASS Deck A Select Mic Input |
| 709 | RVCR Select Preset (#) | | |
| 710 | RVCR Select Input (#) | 1636 | CASS Deck A Deselect Mic Input |
| 711 | RVCR Select Mode (#) | | |
| 712 | RVCR Seek | 1637 | CASS Deck A Start Record |
| 713 | RVCR Scan | 1638 | CASS Deck A Stop Record |
| 714 | RVCR Step Up Preset | 1639 | CASS Deck B Fast Forward |
| 715 | RVCR Step Down Preset | 1640 | CASS Deck B Rewind |
| 716 | RVCR Select AM | 1641 | CASS Deck B Play |
| 717 | RVCR Select FM | 1642 | CASS Deck B Pause |
| 718 | RVCR Select Mode (#) | 1643 | CASS Deck B Unpause |
| 719 | RVCR Select Loudness | 1644 | CASS Deck B Stop |
| 720 | RVCR Deselect Loudness | 1645 | CASS Deck B Select Line Input |
| 721 | RVCR Increase Treble | | |
| 722 | RVCR Decrease Treble | 1646 | CASS Deck B Deselect Line Input |
| 723 | RVCR Increase Bass | | |
| 724 | RVCR Decrease Bass | 1647 | CASS Deck B Select Mic Input |
| 725 | RVCR Mute | | |
| 726 | RVCR Balance Left | 1648 | CASS Deck B Deselect Mic Input |
| 727 | RVCR Balance Right | | |
| 728 | RVCR Balance Front | 1649 | CASS Deck B Start Record |
| 729 | RVCR Balance Rear | 1650 | CASS Deck B Stop Record |
| 730 | RVCR Unmute | 1651 | CASS Select Metal Tape |
| 731 | RVCR Set D (D) T (T) | 1652 | CASS Deselect Metal Tape |
| | | 1653 | CASS Select Normal Tape CASS1 |
| | | 1654 | CASS Deselect Normal Tape |
| | | 1655 | CASS Select CRO2 Tape |
| | | 1656 | CASS Deselect CRO2 Tape |
| | | 1657 | CASS Set D (D) T (T) |

What is claimed and desired to be secured by United States Letters Patent is:

1. A system for communicating instructions to an appliance from a remote location, the appliance being responsive to commands conveyed via an infrared signal, the system comprising:

remote means for dispatching a first control signal from the remote location;

means for receiving the first control signal;

means for translating the first control signal into a second control signal, the second control signal including at least a power on command;

means for emitting the second control signal, the means for emitting comprising means for generating infrared radiation which reaches the appliance, the second control signal being recognized by the appliance; and means for sensing whether the appliance is in a power active state or a power-inactive state, the means for sensing comprising manually adjustable sensitivity means for varying the threshold of detected current drawn by the appliance when in a power active state and for ensuring that the power on command is issued by the means for emitting the second control signal only if the appliance is in a power-inactive state.

2. A system as defined in claim 1 wherein the remote means for emitting a control means comprises one device selected from the group consisting of: a hand-held transmitter, an audio/visual controller, an infrared receiver, and an appliance automation controller.

3. A system as defined in claim 2 wherein the hand-held transmitter comprises:
   an infrared emitter;
   a plurality of function keys, the plurality of functions keys being programmable to change their function from a previous function to a current function; and
   a display, the display including indicia indicating the current function of at least some of the plurality of the function keys.

4. A system as defined in claim 1 wherein the means for receiving the first control signal comprises means for receiving a signal compliant with the CEBus® CAL language.

5. A system as defined in claim 1 wherein the means for translating the first control signal comprises a processor and means for looking up a set of second control signals corresponding to a set of infrared signals which are acceptable to the appliance.

6. A system as defined in claim 1 wherein the means for emitting a second control signal further comprises:
   an infrared emitter;
   means for attaching the infrared emitter in close proximity to an infrared receiver on the appliance; and
   means for connecting the infrared emitter to the means for translating.

7. A system as defined in claim 1 wherein the means for sensing whether the appliance is in a power active state or a power-inactive state further comprises:
   means for providing AC current to the appliance;
   means for sensing the current drawn by the appliance;
   means for comparing the current drawn by the appliance with a predetermined threshold;
   means for manually varying the predetermined threshold;
   means for perceptibly indicating to a user when the current drawn by the appliance exceeds the predetermined threshold; and
   means for preventing the means for emitting a second control signal from emitting a power on command if the current drawn by the appliance exceeds the predetermined threshold.

8. A system as defined in claim 1 further comprising means for selecting an address for the means for receiving the first control signal.

9. A system as defined in claim 1 further comprising:
   means for receiving an infrared signal containing instructions for the appliance; and
   means for modulating an information carrying bus with the first control signal containing the instructions for the appliance and for including an address for the appliance with the first control signal.

10. A system for communicating control signals from a first remote location to a first appliance contained within a structure including a power distribution bus, the appliance being responsive to commands conveyed via an infrared signal, the system comprising:
    remote means for emitting a first control signal from the first remote location;
    means for receiving the first control signal;
    means for translating the first control signal into a second control signal, the second control signal including at least a power on command;
    means for transmitting the second control signal over the power distribution bus;
    means for receiving the second control signal from the power distribution bus and translating the second control signal into a third control signal, the means for receiving the second control signal being in physical proximity with the first appliance;
    means for emitting an infrared signal which reaches the appliance, corresponding to the third control signal; and
    means for sensing whether the first appliance is in a power active state or a power-inactive state, the means for sensing comprising manually adjustable sensitivity means for varying the threshold of current drawn by the appliance when in a power active state and for ensuring that the power on command is issued by the means for emitting an infrared signal only if the first appliance is in a power-inactive state.

11. A system as defined in claim 10 wherein the remote means for emitting a first control signal comprises a hand-held transmitter.

12. A system as defined in claim 11 wherein the hand-held transmitter further comprises:
    an infrared emitter;
    a plurality of function keys, the plurality of functions keys being programmable to change their function from a previous function to a current function; and
    a display, the display including indicia indicating the current function of at least some of the plurality of the function keys.

13. A system as defined in claim 10 wherein the means for transmitting the second control signal comprises:
    means for modulating an information carrying bus with the first control signal containing the instructions for the appliance and for including an address for the appliance with the first control signal.

14. A system as defined in claim 10 wherein the means for receiving the second control signal from the power distribution bus and translating the second control signal into a third control signal comprises a processor means and means for looking up a set of second control signals corresponding to a set of infrared signals which are acceptable to the appliance.

15. A system as defined in claim 10 wherein the means for sensing further comprises:
    means for providing AC current to the first appliance;
    means for sensing the current drawn by the first appliance;
    means for comparing the current drawn by the first appliance with a predetermined threshold;
    means for manually varying the predetermined threshold;
    means for perceptibly indicating to a user when the current drawn by the first appliance exceeds the predetermined threshold; and
    means for preventing the means for emitting a second control signal from emitting a power on command if the current drawn by the appliance exceeds the predetermined threshold.

16. A system as defined in claim 10 wherein the means for receiving the first control signal further comprises means for conveying a third control signal on a signal-carrying bus to a second appliance.

17. A system for communicating control signals from either of a first remote location or a second remote location to a first appliance at a first location or to a second appliance at a second location, the first and the second locations both contained within a structure including a power wiring bus, the system comprising:

remote means for emitting a first control signal, the remote means being movable between the first remote location to the second remote location and including a battery;

means for receiving the first control signal at the first remote location;

means for translating the first control signal into a second control signal, the second control signal including at least a power on command and at least one address;

means for transmitting the second control signal over the power distribution bus;

first means for receiving the second control signal from the power distribution bus and translating the second control signal into a third control signal, the first means for receiving the second control signal being in physical proximity with the first appliance;

first means for decoding the address and determining if the address matches the first appliance address;

first means for conveying the third control signal to the first appliance;

second means for receiving the second control signal from the power distribution bus and translating the second control signal into a third control signal, the second means for receiving the second control signal being in physical proximity with the second appliance;

second means for decoding the address and determining if the address matches the second appliance address;

second means for conveying the third control signal to the second appliance; and means for sensing whether the first appliance is in a power active state or a power-inactive state, the means for sensing comprising manually adjustable sensitivity means for varying the threshold of current drawn by the appliance when in a power active state and for ensuring that a power on command is issued by the first means for conveying the third control signal only if the appliance is in a power-inactive state.

18. A system for retrofitting an appliance having an infrared receiver for intercepting coded infrared commands, the appliance being responsive to the commands conveyed via an infrared signal, the system comprising:

means for receiving a first control signal generated by an appliance controller;

means for translating the first control signal into a second control signal, the second control signal including at least a power on command;

means for emitting an infrared signal an infrared signal which reaches the appliance, the infrared signal corresponding to the second control signal, the infrared signal being recognized by the appliance, and for directing the infrared signal into the infrared receiver;

means for providing operational voltage and current to the appliance; and means for sensing the current flow through the means for providing operational voltage and current to determine whether the appliance is in a power active state or a power-inactive state, the means for sensing comprising manually adjustable sensitivity means for varying the threshold of current drawn by the appliance when in a power active state, the means for sensing operating such that the power on command is issued by the means for emitting the second control signal only if the appliance is in a power-inactive state.

19. A system as defined in claim 18 wherein the means for receiving the first control signal comprises means for receiving a signal compliant with the CEBus® CAL language.

20. A system as defined in claim 18 wherein the means for translating the first control signal into a second control signal comprises a processor and means for looking up a set of second control signals corresponding to a set of infrared signals which are acceptable to the appliance.

21. A system as defined in claim 18 wherein the means for emitting an infrared signal corresponding to the second control signal comprises:

an infrared emitter;

means for attaching the infrared emitter in close proximity to the infrared receiver on the appliance; and means for connecting the infrared emitter to the means for translating.

22. A system as defined in claim 18 wherein the means for providing operational voltage and current to the appliance comprises a NEMA compatible receptacle providing AC power.

23. A system as defined in claim 18 wherein the means for sensing the current flow further comprises:

means for sensing the current drawn by the appliance;

means for comparing the current drawn by the appliance with a predetermined threshold;

means for manually varying the predetermined threshold;

means for perceptibly indicating to a user when the current drawn by the appliance exceeds the predetermined threshold; and means for preventing the means for emitting an infrared signal from emitting a power on command if the current drawn by the appliance exceeds the predetermined threshold.

* * * * *